Patented June 23, 1925.

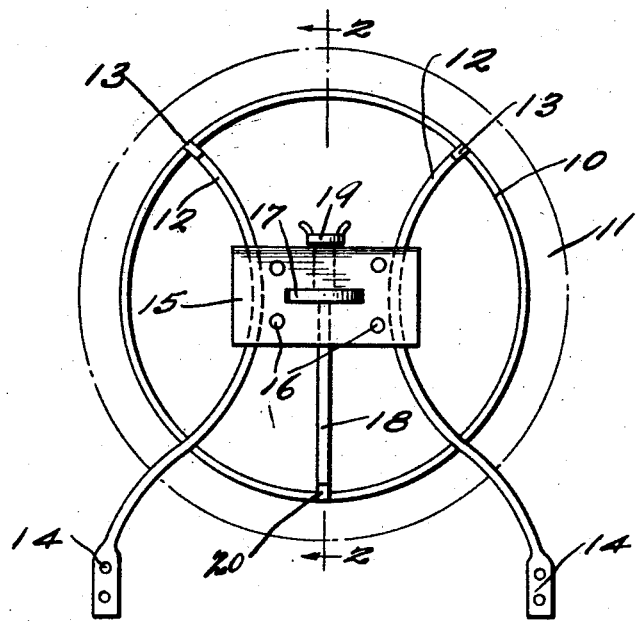
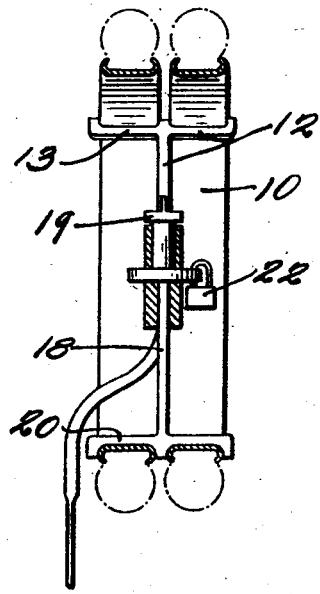
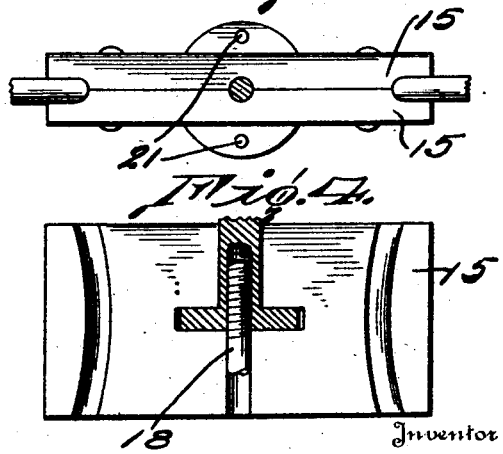

1,543,337

UNITED STATES PATENT OFFICE.

FERDINAND F. MILLER, OF CLASOIL, MONTANA.

SPARE RIM AND TIRE CARRIER.

Application filed October 11, 1923. Serial No. 667,863.

*To all whom it may concern:*

Be it known that I, FERDINAND F. MILLER, a citizen of the United States, residing at Clasoil, in the county of Jefferson and State of Montana, have invented certain new and useful Improvements in a Spare Rim and Tire Carrier, of which the following is a specification.

The present invention relates to a device for carrying spare or extra tires on automobiles, and has for its principal object to provide a simple, substantial, easily operated carrier which may be securely attached to the rear or other portion of an automobile for rigidly supporting one or more tires, as the owner may desire.

Another object of the invention is to provide a spare rim and tire carrier which may be readily attached to a portion of the vehicle and readily locked thereon to prevent unauthorized persons from removing the tires therefrom.

A further object of the invention is to provide a spare rim and tire carrier which may be suitably mounted upon a portion of the vehicle and so adjusted that the spare tires and rims may be snugly fitted thereon and locked in position to prevent the theft thereof.

Other objects and advantages of the invention will be apparent during the course of the following detail description.

In the accompanying drawing forming a part of this specification and in which like numerals are employed to designate like parts throughout the same.

Figure 1 is a rear view of my invention.

Figure 2 is a sectional view taken on line 2—2 of Figure 1.

Figure 3 is a sectional view of the guard plate in locked position and

Figure 4 is an enlarged detail view showing the adjusting pin and the course it pursues through the guard or locking plate.

Referring now to the drawing wherein like characters of reference denote corresponding parts, the numeral 10 indicates the spare rim or tire carrier having a tire 11 supported thereon and bracing members 12 suitably spaced apart and extending through the central portion of the rim. These members have their upper ends bifurcated as at 13 for engaging the inner surface of the rim, while the free or lower ends of the base or supporting members terminated to provide securing portions which have openings 14 for the reception of fastening elements for suitably attaching and supporting the rim and carrier on a portion of a vehicle.

Arranged centrally within the carrier is a pair of metallic plates 15 which surround the bracing or supporting members 12 intermediate their ends and these plates are provided with apertures 16 adjacent their ends for the reception of fastening elements which connect and hold the plates in locked position.

A circular retaining member 17 encircles the metallic plates for holding the same in close relation and said members are designed to receive an adjusting pin 18 which passes centrally between the plate, and said pin has a thumb adjusting portion 19 provided at the top thereof and the upper portion of this pin adjacent the thumb adjusting member is screw threaded for forcing the lower bifurcated ends 20 into engagement with the rim, so that the spare rim or tire which is being supported on the carrier may be snugly retained thereon. The circular member which surrounds the plate is provided with openings 21 which are formed therein to receive a lock 22 for holding the rim and carrier in locked position and thereby eliminate the danger of unauthorized persons from removing the tires and rim which may be carried by the device.

In use this device is designed to be secured to a portion of a motor vehicle and a tire or two may be placed upon the carrier and the thumb adjusting member provided on the adjusting pin is designed to be moved downwardly between the plate for engaging the lower portion of the rim so that the latter will bear against the inner surface of the tire and thereby hold the same thereon. The operator of the vehicle then passes the lock through the opening formed in the circular member which surrounds the adjustable pin and locks the same thereon to prevent unauthorized persons from removing the rim and tire from the carrier.

In view of the foregoing description of my invention taken in connection with the accompanying drawing, it is thought that any further explanation as to the construction and operation and objects of this invention are unnecessary.

While I have shown and described the preferred form of my invention, I realize that various minor changes may be resorted to, without departing from the spirit and scope of the invention as claimed, and therefore, I do not wish to limit myself to the exact detail of construction shown, nor to the combination and arrangement of parts.

What I claim is:—

1. A spare rim and tire carrier, comprising spaced supporting members, guide plates attached to said supporting members, a circular member carried by said guide plates, the supporting members having their upper ends bifurcated for engaging the tire rim, said circular member having an aperture therein, an adjustable pin engaging the apertured circular member, the lower end of said pin being bifurcated for engaging the bottom of the rim for holding the same snugly upon the carrier.

2. A spare rim and tire carrier, comprising a pair of plates having slots therein arranged opposite each other, means for supporting said plates in position, stationary means carried by said plates for engaging the tire rim, a manually operated member rotatably supported between said plates, an annular flange formed on said manually operated member, said flange extending through the oppositely disposed slots in said plates, a movable arm engaging said manually operated means and adapted to be moved towards or away from the same upon rotation thereof, and means on said movable arm adapted to engage said tire rim.

3. A spare rim and tire carrier, comprising a pair of plates having slots therein arranged opposite each other, means for supporting said plates in position, stationary means carried by said plates for engaging the tire rim, a manually operated member rotatably supported between said plates, an annular flange formed on said manually operated member, said flange extending through the oppositely disposed slots in said plates, a movable arm engaging said manually operated means and adapted to be moved towards or away from the same upon rotation thereof, means on said movable arm adapted to engage said tire rim, said annular flange having an aperture therein, and means engaging in said aperture for preventing turning movement of said flange and manually operated member.

4. A spare rim and tire carrier, comprising a pair of plates, said plates having oppositely disposed arcuate grooves formed in their inner sides and at each end thereof, a pair of supporting rods each having the portion intermediate its ends received in said arcuate grooves, said supporting rods having their upper ends arranged to engage the tire rim, and an adjustable member carried by said plates and adapted to engage said tire rim at a point opposite to that engaged by said supporting rods.

5. A spare rim and tire carrier, comprising a pair of plates having oppositely disposed grooves formed therein on their inner sides, a pair of supporting rods attached to said plates and adapted to engage said tire rim, a manually operated rotatable member received between said grooves at one end thereof, said manually operated member having a threaded opening therein, an adjustable member having one end received in said threaded openings of said manually operated member so as to slide said adjustable member upon rotation of said manually operated member, and means on the free end of said adjustable member for engaging said tire rim at a point opposite to that engaged by said supporting rods.

In testimony whereof, I have affixed my signature in the presence of two witnesses.

FERDINAND F. MILLER.

Witnesses:
 JAMES A. WALSH,
 JOHN L. MILLER.